US012129866B2

(12) United States Patent
Makarenko et al.

(10) Patent No.: US 12,129,866 B2
(45) Date of Patent: Oct. 29, 2024

(54) COMPRESSOR WHEEL FOR THE COMPRESSOR OF AN INTERNAL COMBUSTION ENGINE

(71) Applicant: Vitesco Technologies GmbH, Regensburg (DE)

(72) Inventors: Igor Makarenko, Munich (DE); Stefan Reuter, Munich (DE); Bernhard Lehmayr, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/257,775

(22) PCT Filed: Nov. 25, 2021

(86) PCT No.: PCT/EP2021/083062
§ 371 (c)(1),
(2) Date: Jun. 15, 2023

(87) PCT Pub. No.: WO2022/128396
PCT Pub. Date: Jun. 23, 2022

(65) Prior Publication Data

US 2024/0255001 A1 Aug. 1, 2024

(30) Foreign Application Priority Data

Dec. 18, 2020 (DE) ..................... 10 2020 216 280.8

(51) Int. Cl.
*F04D 29/28* (2006.01)
*F04D 25/02* (2006.01)
*F04D 29/30* (2006.01)

(52) U.S. Cl.
CPC ......... *F04D 29/284* (2013.01); *F04D 25/024* (2013.01); *F04D 29/30* (2013.01); *F05D 2220/40* (2013.01); *F05D 2240/301* (2013.01); *F05D 2240/303* (2013.01)

(58) Field of Classification Search
CPC ...... F04D 29/284; F04D 25/024; F04D 29/30; F05D 2220/40; F05D 2240/301; F05D 2240/303
See application file for complete search history.

(56) References Cited

U.S. PATENT DOCUMENTS 4,543,041 A * 9/1985 French .................. F04D 29/284 416/183
8,956,118 B2 * 2/2015 Wakai .................. F04D 29/284 416/183
11,002,149 B2 * 5/2021 Bousfield ................ F01D 5/147
(Continued)

FOREIGN PATENT DOCUMENTS

DE 202015101910 U1 6/2015

*Primary Examiner* — Jesse S Bogue
(74) *Attorney, Agent, or Firm* — Laurence A. Greenberg; Werner H. Stemer; Ralph E. Locher

(57) ABSTRACT

A compressor wheel is provided for an exhaust-gas turbocharger of an internal combustion engine. The compressor wheel has a hub, which extends around a central axis of the compressor wheel, and compressor wheel blades, which are connected to the hub and the blade leading edges of which extend in a radial direction and have a hub-side end region and an end region that is radially remote from the hub. The blade leading edges are blunt in their end region that is radially remote from the hub.

7 Claims, 7 Drawing Sheets

(56) References Cited

U.S. PATENT DOCUMENTS

| | | | | |
|---|---|---|---|---|
| 11,384,774 | B2 * | 7/2022 | Hayashi | F04D 17/10 |
| 2010/0254816 | A1 * | 10/2010 | Dettmann | F04D 29/284<br>416/223 A |
| 2012/0121432 | A1 * | 5/2012 | Wakai | F01D 5/048<br>416/243 |
| 2017/0268528 | A1 | 9/2017 | Naruoka et al. | |

* cited by examiner

COMPRESSOR WHEEL FOR THE COMPRESSOR OF AN INTERNAL COMBUSTION ENGINE

FIELD AND BACKGROUND OF THE INVENTION

The present invention relates to a compressor wheel for the compressor of an internal combustion engine.

Exhaust-gas turbochargers are already known. They have, inter alia, a turbine and a compressor, wherein the turbine is equipped with a turbine wheel and the compressor is equipped with a compressor wheel.

It is furthermore already known, in the exhaust-gas system of an internal combustion engine equipped with an exhaust-gas turbocharger, to use exhaust-gas recirculation in order to reduce undesired exhaust-gas emissions, in particular nitrogen oxide emissions, from gasoline and diesel engines. In the case of external exhaust-gas recirculation, the exhaust gas is extracted from the exhaust-gas system. Specifically when using low-pressure exhaust-gas recirculation, the exhaust gas, after having undergone exhaust-gas aftertreatment, is extracted downstream of a particle filter and fed back in upstream of the compressor of the exhaust-gas turbocharger. The exhaust gas is mixed with fresh air in the compressor.

It is furthermore already known for the compressor wheels of exhaust-gas turbochargers in passenger vehicle motor applications to be produced using a milling process or a casting process. Milled compressor wheels are normally produced from wrought aluminum alloys.

Various constituents in the exhaust gas can cause damage to the compressor wheel during the operation of a motor vehicle. One damage mechanism is corrosion to the compressor wheel material owing to corrosive elements in the exhaust gas. Furthermore, aside from water vapor and carbon dioxide, the exhaust gas contains pollutants that have formed during the combustion process and particles that originate from the exhaust-gas aftertreatment.

Depending on the operating point of the internal combustion engine, the water vapor can condense, forming water droplets. Following exhaust-gas recirculation, both said pollutants and the water droplets can cause damage in the form of erosion when they strike the blade leading edges of the compressor wheel. Such damage to the compressor wheel leads to a considerable deterioration in the operating behavior and the service life of the exhaust-gas turbocharger.

In order to protect the compressor wheel of an exhaust-gas turbocharger against corrosion and particle and droplet damage, it is already known for compressor wheels to be provided with a coating, in particular a so-called NiP (electroless nickel) coating.

To achieve the best possible fluid mechanics characteristics, both the main blades and—if present—the splitter blades of a compressor wheel are made as thin and sharp-edged as possible. This has the result that the leading edges of the compressor blades are also sharp-edged or slightly elliptical over their entire radial extent. Here, the shape of a main blade leading edge corresponds to the shape of a splitter blade leading edge that may be present.

Thickening the compressor wheel blades in order to improve the robustness of the compressor wheel with respect to droplet and particle impact is avoided, because such thickening would have an adverse effect on the fluid mechanical and thermodynamic characteristics of the compressor.

SUMMARY OF THE INVENTION

It is the object of the invention to design the compressor of an exhaust-gas turbocharger such that damage to the compressor wheel caused by components contained in the exhaust gas during the operation of the motor vehicle is reduced.

Said object is achieved by means of a compressor wheel having the features specified in the independent compressor wheel claim. Advantageous embodiments and developments of the invention are specified in the dependent claims.

The advantages of the invention consist in particular in the fact that the robustness of the compressor wheel with respect to droplet and particle impact is improved in relation to the prior art, whilst an associated deterioration of the fluid mechanical and thermodynamics characteristics of the compressor is negligible. Further advantageous characteristics of the invention will emerge from the exemplary explanation thereof below on the basis of the figures, in which:

DETAILED DESCRIPTION OF THE INVENTION

Figure 1:
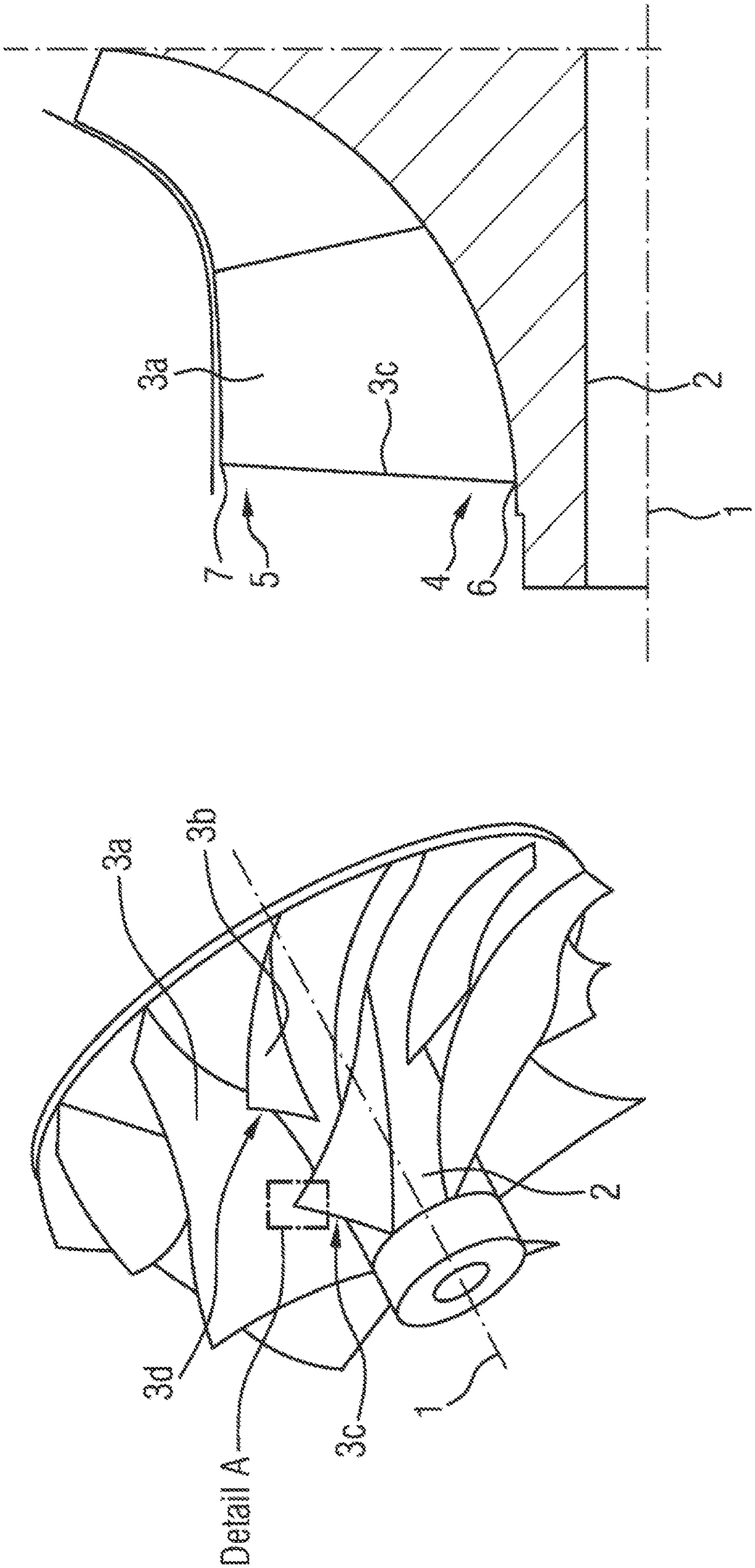
FIG. 1 shows drawings of a conventional compressor wheel.

FIG. 1 shows drawings of a conventional compressor wheel. Here, the drawing on the left in FIG. 1 is a perspective illustration of the conventional compressor wheel, and the drawing on the right is a sectional illustration of said compressor wheel. The compressor wheel illustrated has a hub 2 which extends around a central axis 1 of the compressor wheel. Compressor wheel blades 3*a* and 3*b* are provided on said hub. The hub and the compressor wheel blades provided thereon are preferably formed monolithically as a single piece, and are either milled or cast. The radially inner region of the hub 2 is hollow, such that the hub can be fastened on the shaft of an exhaust-gas turbocharger.

Said blades are main blades 3*a* and splitter blades 3*b*, wherein the splitter blades 3*b* are arranged in each case between two main blades 3*a*. The splitter blades 3*b* are shorter in an axial direction of the central axis 1, and smaller in a radial direction, than the main blades 3*a*. The main blades 3*a* have main blade leading edges 3*c* which extend in a radial direction or predominantly in a radial direction and which have a hub-side end region 4 and an end region 5 that is remote from the hub. The splitter blades 3*b* have splitter blade leading edges 3*d* which likewise extend in a radial direction or predominantly in a radial direction and which have a hub-side end region and an end region which is remote from the hub and which, in the installed state of the compressor wheel, faces the flow-guiding contour of the surrounding compressor wheel housing or of the compressor shroud, also referred to as shroud. That end region of the blade leading edges which is remote from the hub is therefore also referred to in this description as “shroud-side end region” or “shroud region” or “shroud-side end point”.

Here, the blade leading edges may extend rectilinearly outward in a purely radial direction proceeding from the hub 2. Embodiments however also exist in which the blade leading edges extend outward proceeding from the hub 2 so as to deviate from the straight radial direction obliquely or in curved form, which is summarized here under the expression “predominantly in a radial direction”, wherein this wording also encompasses a profile in a purely radial direction.

As can be seen from FIG. 1, the blade leading edges both of the main blades and of the splitter blades are in each case of sharp-edged form. They may alternatively also be elliptical.

From the sectional illustration shown on the right-hand side in FIG. 1, it is possible in particular to see the hub 2 and a main blade 3*a* provided on said hub. In its hub-side end region 4, the leading edge 3*c* of the main blade 3*a* has an end point 6, which is the connecting point that connects the hub to the leading edge of the main blade. Furthermore, in its end region 5 that is radially remote from the hub 2, the leading edge 3*c* of the main blade 3*a* has an end point 7, which is the shroud-side end point of the leading edge of the main blade.

Figure 2:
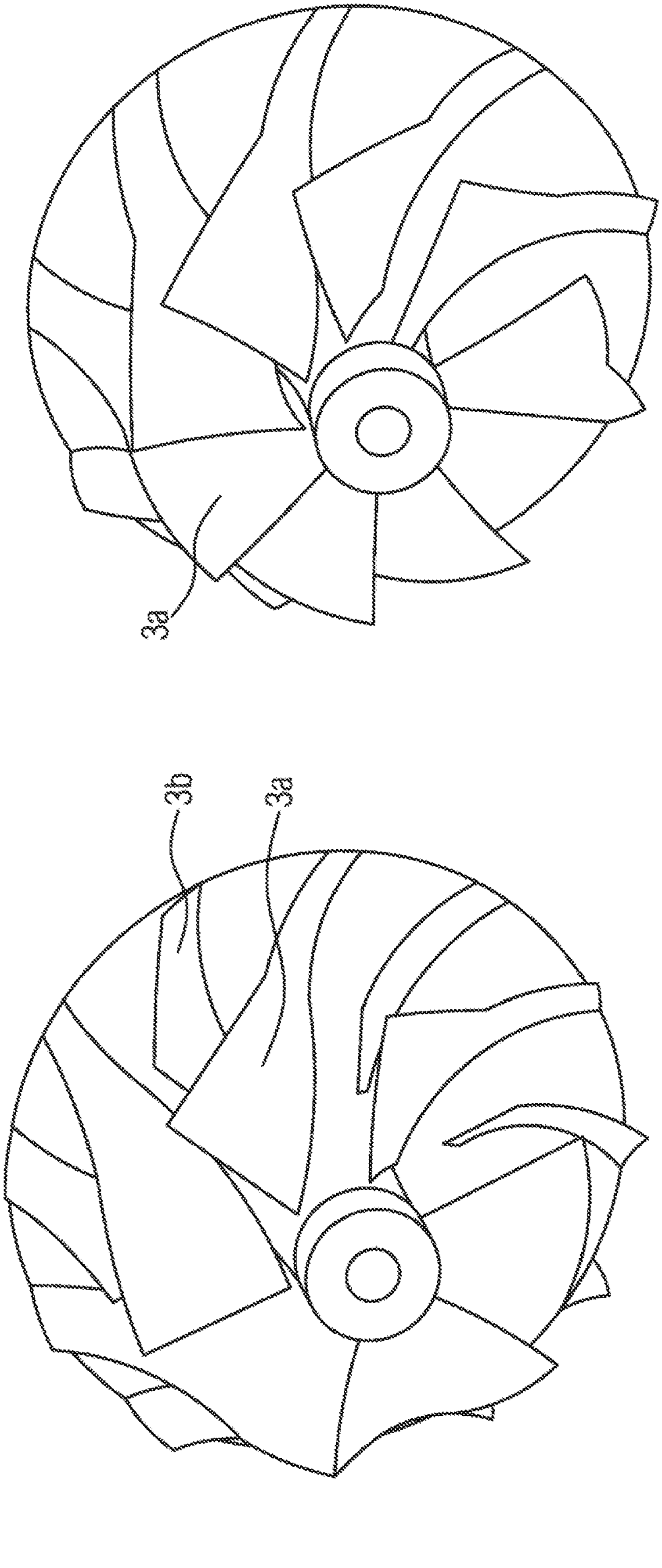
FIG. 2 shows drawings of two different conventional compressor wheels.

FIG. 2 shows drawings of two different conventional compressor wheels.

Here, the drawing on the left in FIG. 2 is a perspective illustration of the conventional compressor wheel already shown in FIG. 1, which has main blades 3*a* and splitter blades 3*b*. The drawing on the right in FIG. 2 shows a conventional compressor wheel that has only main blades 3*a* but no splitter blades 3*b*.

Figure 3:
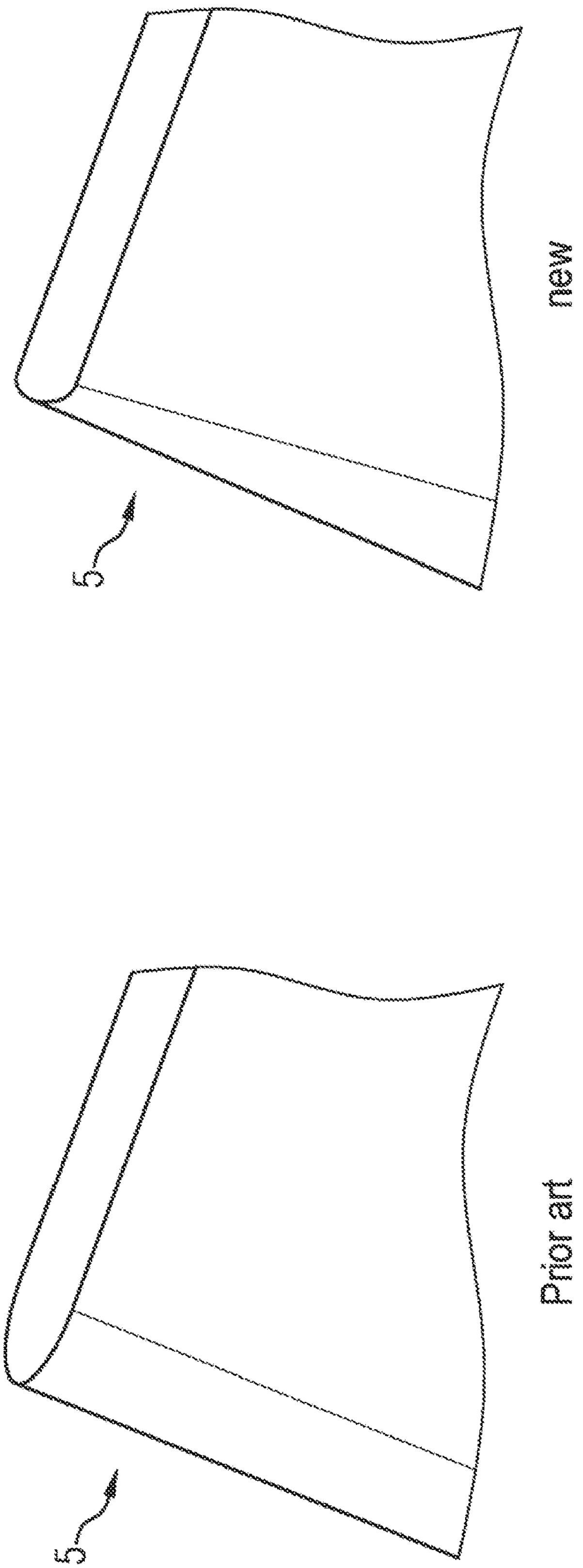
FIG. 3 shows drawings illustrating the shroud-side end region of a conventional blade leading edge, and of a blade leading edge according to the invention, of a compressor wheel blade.

FIG. 3 shows drawings illustrating the shroud-side end region 5 of a conventional blade leading edge according to the invention of a compressor wheel blade which is a main blade.

Here, the shroud-side end region 5 of a conventional blade leading edge is illustrated on the left in FIG. 3. It can be seen that the blade leading edge is elliptical in its shroud-side end region.

By contrast, the shroud-side end region 5 of a blade leading edge according to the invention is illustrated on the right in FIG. 2. It can be seen that this blade leading edge is blunt in its shroud-side end region.

In its hub-side end region, which is not illustrated in FIG. 3, the blade leading edge is elliptical, as in the prior art.

In the case of the compressor wheel that has main blades and splitter blades, the leading edges of the splitter blades are sharp-edged or elliptical over their entire radial extent, as in the prior art. It is however alternatively also possible for the leading edges of the splitter blades to be blunt, for example semicircular, over their entire radial extent.

The above-described blunt form of the shroud-side end region of the blade leading edge of a main blade exists both if the compressor wheel has main blades and splitter blades and if the compressor blade has only main blades but no splitter blades.

Furthermore, the above-described blunt form of the shroud-side end region of the blade leading edge of a main blade may be used both in the case of milled compressor wheels and in the case of cast compressor wheels.

Figure 4:
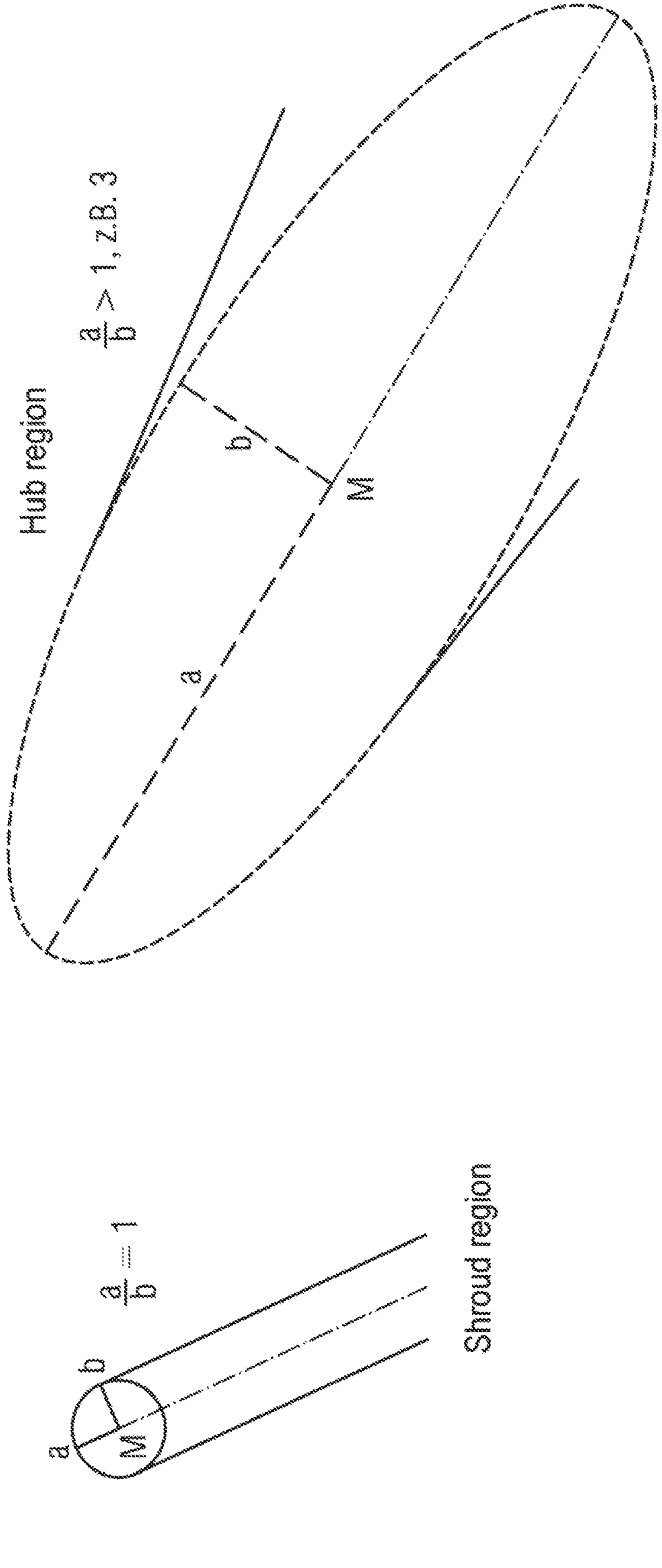
FIG. 4 shows drawings illustrating the shape of a blade leading edge according to the invention in the shroud region and in the hub region of a compressor wheel blade.

FIG. 4 shows drawings illustrating the shape of a blade leading edge according to the invention in the shroud region and in the hub region of a compressor wheel blade.

Here, on the left in FIG. 4, a drawing is shown which illustrates the embodiment of the blade leading edge in the shroud region in a section perpendicular to the blade leading edge.

In this exemplary embodiment, the blade leading edge is blunt, in this case specifically semicircular, as indicated by the circle illustrated using dashed lines. For a blunt embodiment of the blade leading edge, the following inequation applies:

$$a/b \leq 1$$

where “a” is the spacing from the blade end to the central point M of the rounded portion, and where “b” is the spacing, perpendicularly with respect to “a”, from the blade side surface to the central point M. Here, M is the central point of the rounded portion of the blade leading edge, which central point is, as viewed in the section, defined by the point of intersection of the chord line of the blade with a line extending through the transition points between the blade side surfaces and the start of the rounded portion.

In the embodiment of the blade leading edge in the shroud region as illustrated in FIG. 4, the letter M denotes the central point of said circle or semicircle, and in this case the relationship a/b=1 applies. In further embodiments, the ratio a/b may advantageously be a/b≤0.8, in particular even a/b≤0.5, which signifies even more extensively blunted embodiments.

On the right in FIG. 4, a drawing is shown which illustrates the embodiment of the blade leading edge in the hub region. In this exemplary embodiment, the blade leading edge is sharp-edged, in this case specifically elliptical, as indicated by the illustrated ellipse. Here, for a sharp-edged embodiment, the following relationship as indicated in the drawing applies:

$$a/b > 1, \text{ for example } a/b = 3.$$

In the embodiment of the blade leading edge in the hub region as illustrated in FIG. 4, the letter M denotes the central point of said ellipse.

Figure 5:
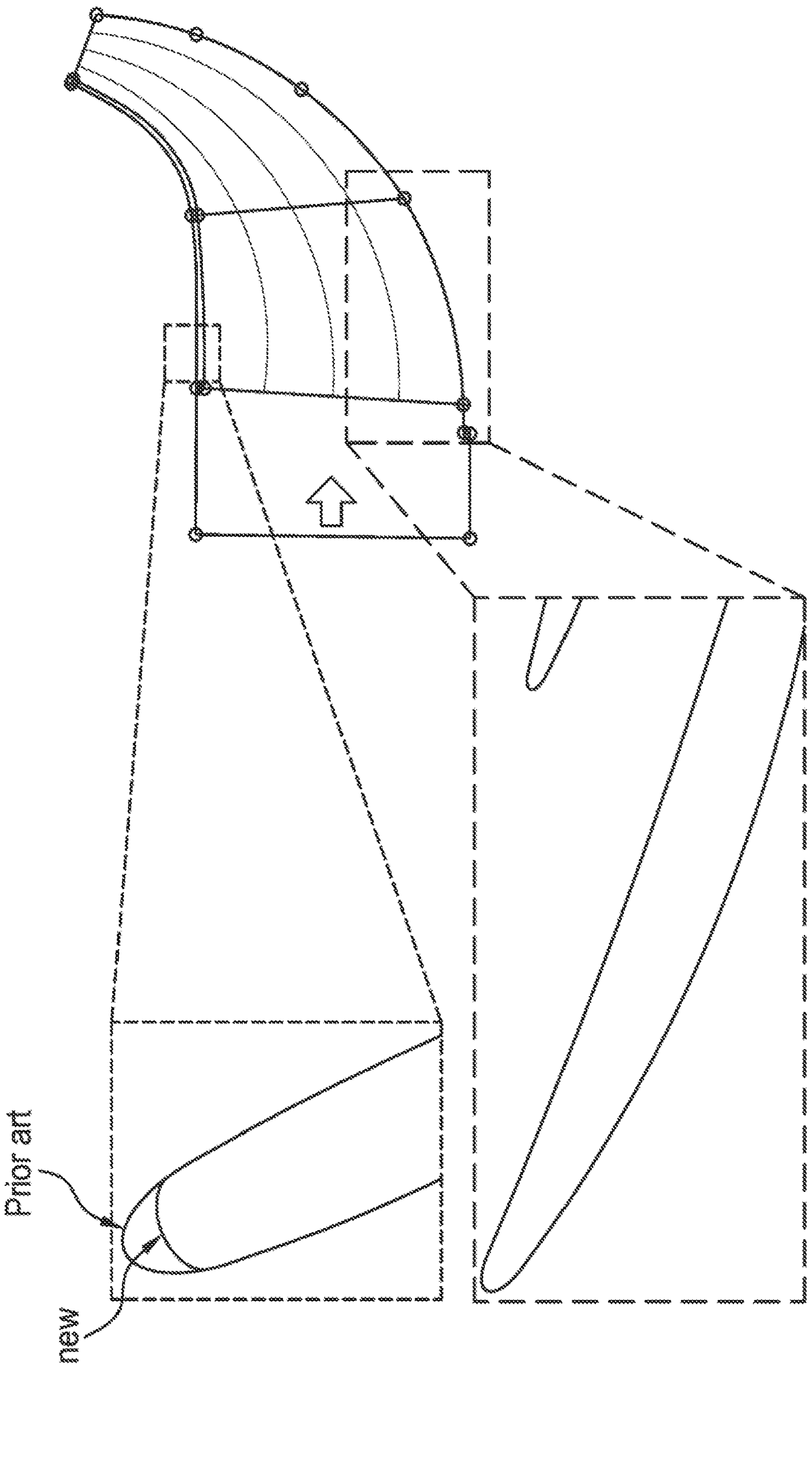
FIG. 5 shows a further drawing illustrating the shape of a blade leading edge in the shroud region and in the hub region of a compressor wheel blade.

FIG. 5 shows a further drawing illustrating the shape of a blade leading edge in the shroud region and in the hub region of a compressor wheel blade.

From this drawing, too, it can be seen that, in the prior art, the blade leading edge of the illustrated compressor wheel blade is elliptical, that is to say sharp-edged, in its end region that is remote from the hub, whilst in the case of the invention, said blade leading edge is blunt, preferably semicircular. It can also be seen from this drawing that the blade leading edge of the illustrated compressor wheel blade is elliptical in its hub region both in the prior art and in the case of the invention.

Figure 6:
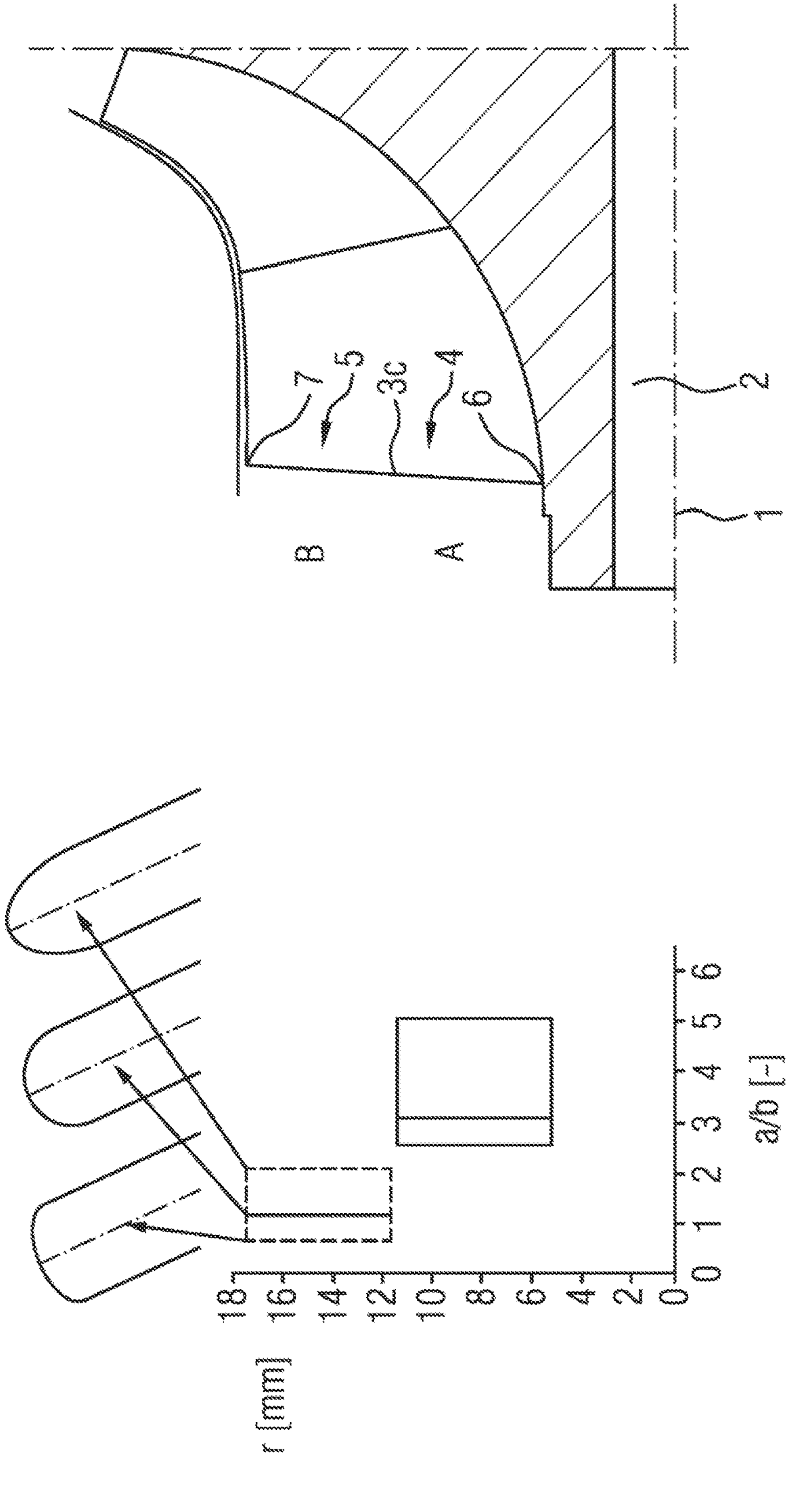
FIG. 6 shows a further drawing illustrating the invention.

FIG. 6 shows a further drawing illustrating the invention.

In the diagram on the left in FIG. 6, the radial position r at the main blade leading edge of the compressor wheel is plotted upwardly, and the ratio of the semiaxes a/b is plotted from left to right. The drawing on the right in FIG. 6 is a sectional illustration through a part of the compressor wheel, showing inter alia the entire radial extent of the blade leading edge.

It can be seen that the blade leading edge is blunt in the outer diameter region B of the blade leading edge, that is to say in that end region of the blade leading edge which is remote from the hub, whilst said blade leading edge is elliptical in the inner diameter region A, that is to say in the hub-side end region of the blade leading edge.

In the exemplary embodiment illustrated, the outer diameter region B corresponds approximately to half of the radial extent of the blade leading edge. In the diagram on the left in FIG. 6, the relevant ratios of the semiaxes a/b at the corresponding position r at the blade leading edge are illustrated in the form of range windows. All geometrical forms that lie within the range windows are possible.

Figure 7:
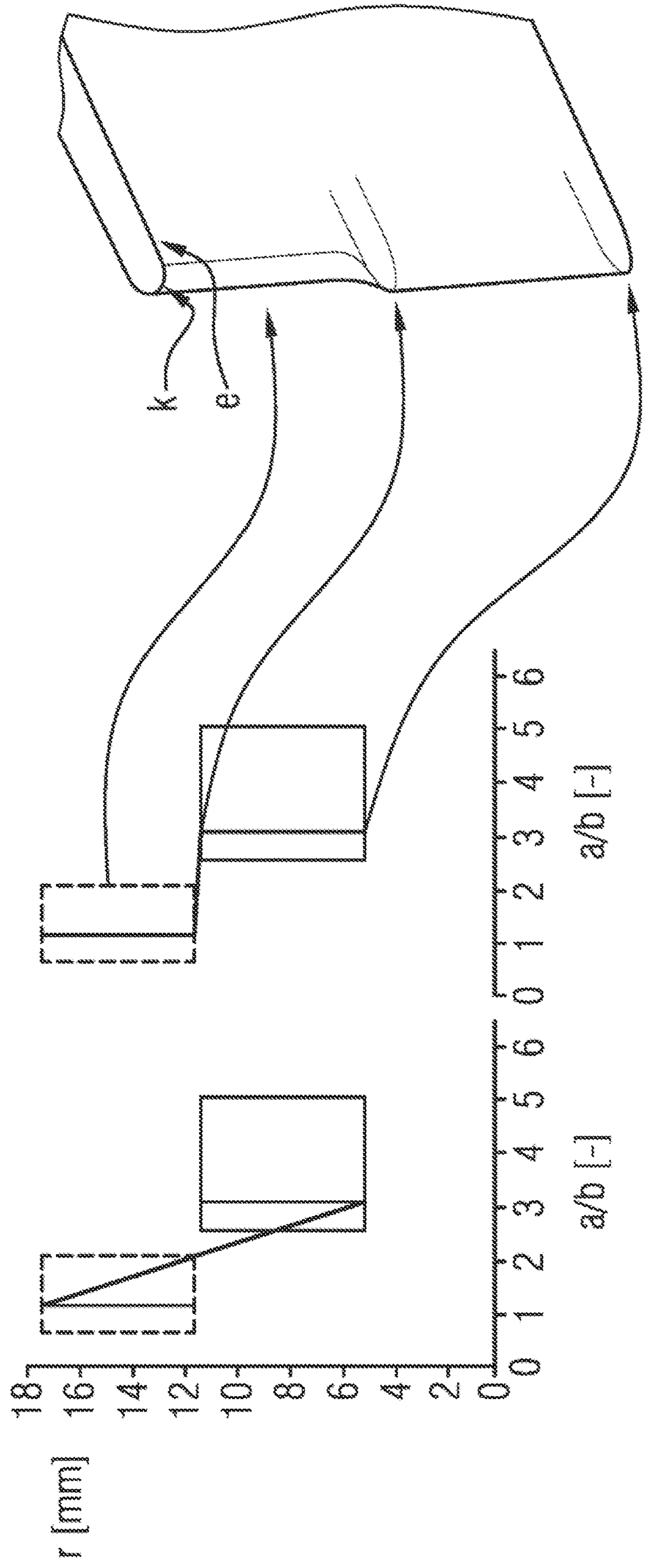
FIG. 7 shows a drawing illustrating further embodiments of the invention.

FIG. 7 illustrates various exemplary embodiments. Among others, a linear course of the ratio of the semiaxes a/b over the course of the blade leading edge from the hub to the shroud-side end region, that is to say from the end point 6 of the hub-side end region 4 to the end point 7 of that end region 5 of the blade leading edge which is remote from the hub (see FIG. 6), is possible, as illustrated on the left in FIG. 7. Furthermore, a discontinuous change from a sharp-edged form to a blunt form of the blade leading edge of the compressor wheel is possible, as illustrated in the middle and on the right in FIG. 7. The transition from the elliptical form to the blunt form is geometrically smoothed. It is furthermore possible for the blunt region of the blade leading edge to be implemented by way of a combination of a semicircular form and an elliptical form, as indicated at the top right in FIG. 7 by the letters k and e. Here, in the region before the transition to the blunt rounding of the blade leading edge, the side surfaces of the compressor blades extend, over a partial region, on an elliptical path towards the blade leading edge.

The invention claimed is:

1. A compressor wheel for an exhaust-gas turbocharger of an internal combustion engine, the compressor wheel comprising:

a hub extending around a central axis of the compressor wheel; and compressor wheel blades disposed on said hub and having blade leading edges which extend predominantly in a radial direction, said blade leading edges each having a hub-side end region and an end region that is radially remote from said hub, wherein said blade leading edges are blunt in said end region that is radially remote from said hub and said blade leading edges are sharp-edged and elliptical on said hub-side end region.

2. The compressor wheel according to claim 1, wherein said blade leading edges are semicircular in said end region that is radially remote from said hub.

3. The compressor wheel according to claim 1, wherein said compressor wheel blades are main blades.

4. The compressor wheel according to claim 3, further comprising splitter blades having splitter blade leading edges extending in the radial direction, said splitter blade leading edges having a splitter hub-side end region and a splitter end region that is remote from said hub in the radial direction.

5. The compressor wheel according to claim 4, wherein said splitter blade leading edges of said splitter blades are sharp-edged over an entire radial extent or elliptical over the entire radial extent.

6. The compressor wheel according to claim 4, wherein said splitter blade leading edges of said splitter blades are blunt over an entire radial extent.

7. The compressor wheel according to claim 6, wherein said splitter blade leading edges of said splitter blades are semicircular over an entire radial extent.

* * * * *